Figure 1:
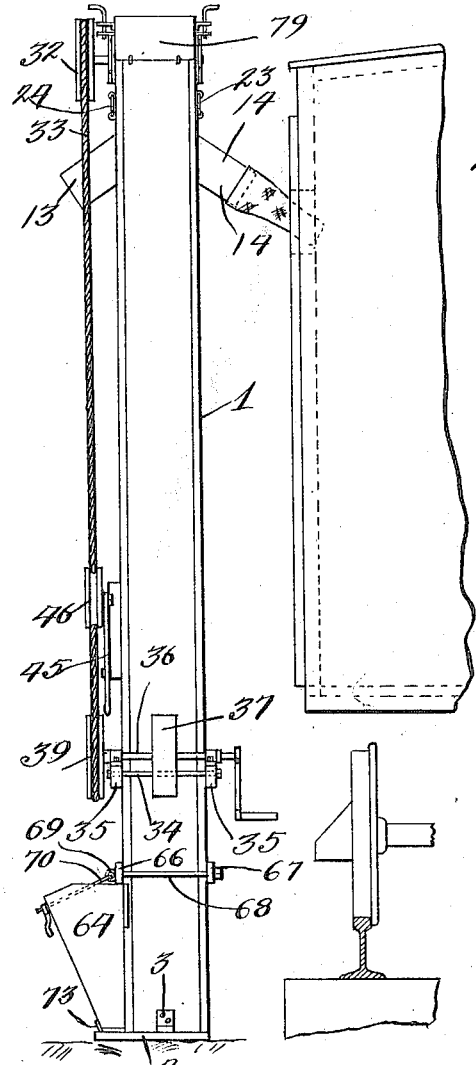

F. MORRIS & P. B. KRAMER.
GRAIN ELEVATOR.
APPLICATION FILED JULY 11, 1914.

1,197,226.

Patented Sept. 5, 1916.
3 SHEETS—SHEET 1.

Witnesses
Philip Terell
Francis G. Orwell

Inventors
F. Morris and
P. B. Kramer
By D. Swift & Co.
Their Attorneys

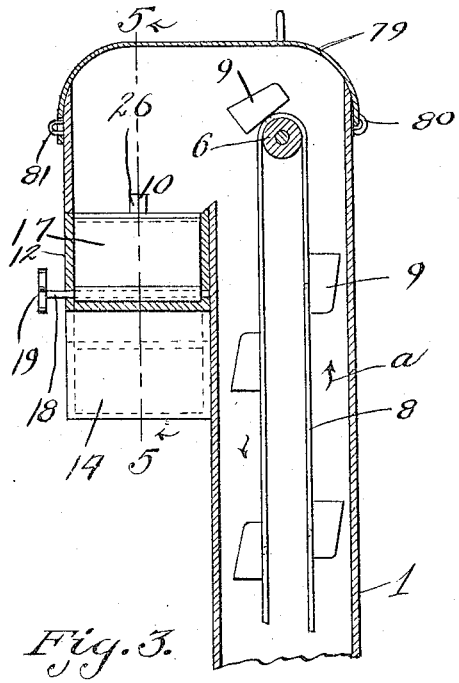
Fig. 3.
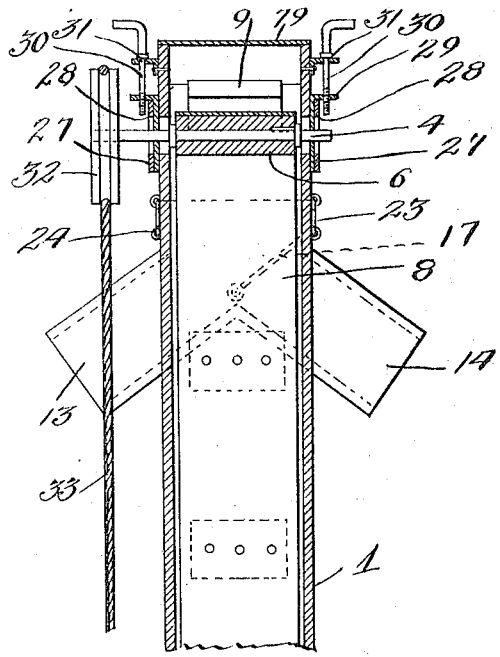
Fig. 4.
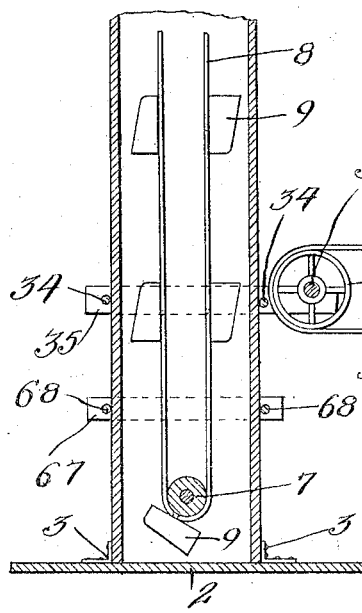
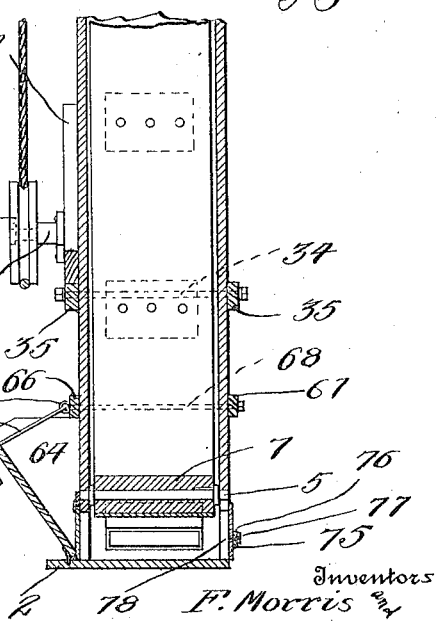

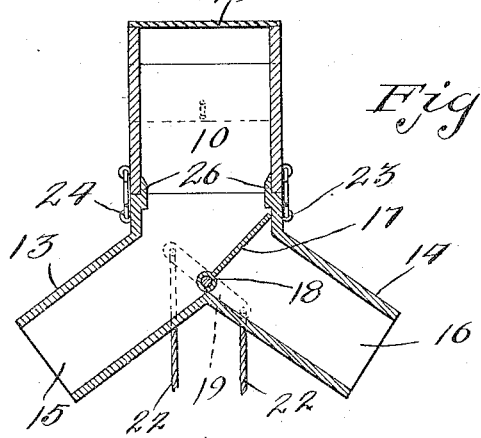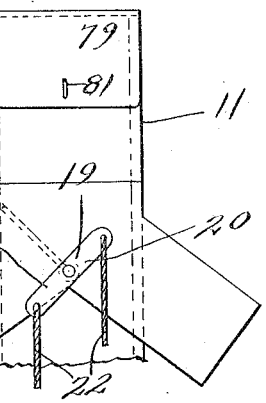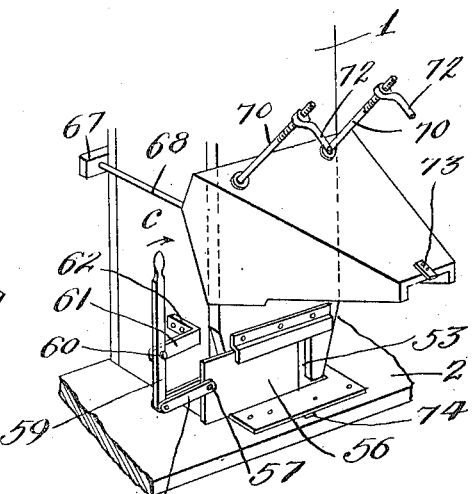

ABSENT# UNITED STATES PATENT OFFICE.

FRANK MORRIS AND PETER B. KRAMER, OF RITZVILLE, WASHINGTON.

GRAIN-ELEVATOR.

1,197,226.  Specification of Letters Patent.  Patented Sept. 5, 1916.

Application filed July 11, 1914. Serial No. 850,325.

*To all whom it may concern:*

Be it known that we, FRANK MORRIS and PETER B. KRAMER, citizens of the United States, residing at Ritzville, in the county of Adams and State of Washington, have invented a new and useful Grain-Elevator; and we do hereby declare the following to be a full, clear, and exact description of the invention, such as will enable others skilled in the art to which it appertains to make and use the same.

This invention relates to an improved grain elevator, and an object of the invention is to provide a device of this nature, whereby the grain raisers are enabled to handle their grain in bulk more efficiently and expeditiously, so as to ship it to the market, in lieu of handling the grain in sacks and the like, which is now the custom.

The machine is set up adjacent a grain tank building or railroad car, said elevator being portable from place to place, and the grain is deposited in the hopper at the lower portion of the machine, and elevated to the grain tank building or car. If desired, the casing of the machine may be made of great height, so that the grain may be elevated to a third, fourth, fifth or sixth story building.

In practical fields the details of construction may necessitate alterations, falling within the scope of what is claimed.

The invention comprises further features and combination of parts, as hereinafter set forth, shown in the drawings and claimed.

Figure 2:
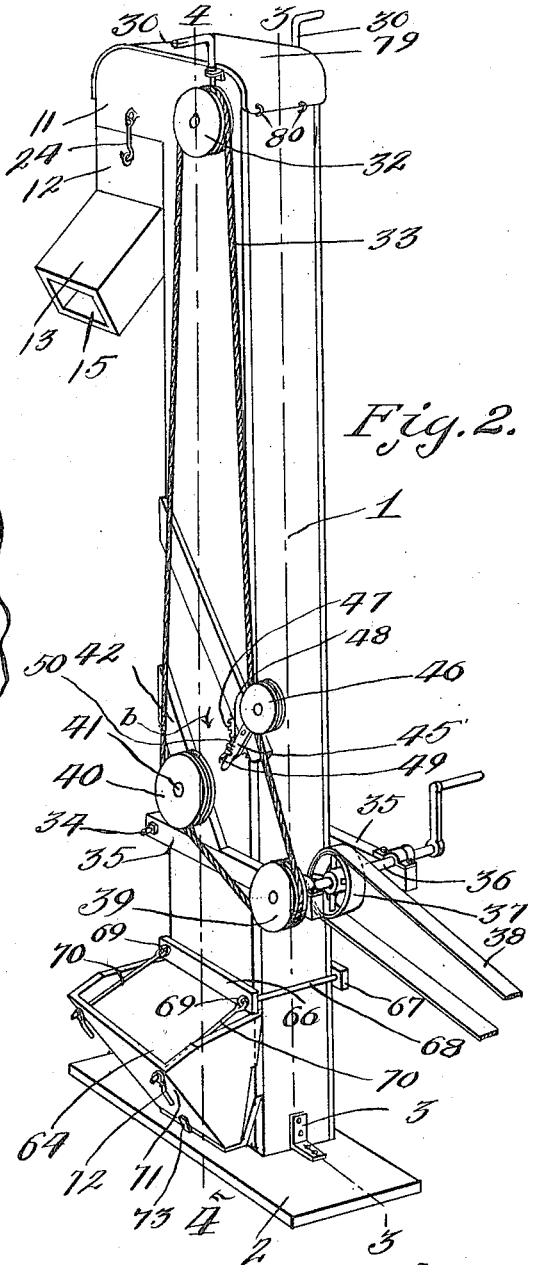

In the drawings: Figure 1 is a view showing the elevator arranged adjacent a railroad car, for elevating the grain therein. Fig. 2 is a perspective view of the elevator. Fig. 3 is a vertical sectional view on line 3—3 of Fig. 2. Fig. 4 is a sectional view on line 4—4 of Fig. 2 taken at right angles to Fig. 3. Fig. 5 is a sectional view on line 5—5 of Fig. 3, showing the check gate. Fig. 6 is a detail view, showing the structure and the outlet opening to the hopper. Fig. 7 is a detail sectional view showing the hopper swung in another position.

Referring to the drawings, 1 designates a vertical casing, which may be any suitable height or width, which is supported on a base 2 by means of the angled plates 3. Mounted in the upper and lower ends of the casing are the spindles 4 and 5 of the rollers or drums 6 and 7, about which the elevator belt 8 travels, which belt is provided with suitable elevator buckets 9. These buckets are so arranged that when the belt moves in the direction of the arrow $a$, they will discharge or empty their contents through the discharge mouth or passage 10. Detachably hooked adjacent the passage 10 and to the offset portion 11 of said casing 1 is a chute casing 12 having laterally branching portions 13 and 14 provided with passages 15 and 16, there being a check gate 17 on a rock shaft 18, which is mounted in bearings of the chute casing. This rock shaft is provided with a transverse lever at its end, which lever 19 is provided with two arms 20 and 21, to each of which a rope or cable 22 is connected. By pulling one of the cables or ropes 22 the arm 21 is pulled downwardly, so as to close the passage 15 by said gate, allowing the grain to pass through the passage 16 into the car. By pulling upon the other cable or rope, the arm 20 is pulled downwardly, thereby closing the passage 16, which will cause the grain to pass out through the passage 15. This chute casing is hooked at 23 and 24 to the offset portion of the casing 1, and is provided with extensions 26 extending into the passage 10, so as to hold the chute casing in registration with the passage 10. The spindles of the upper roller 6 are mounted in bearings of the slides 27, which are mounted in guides 28. Slides 27 are provided with angled portions 29, in which the screws 30 are threaded, said screws being swivelly mounted in the bearings 31. By rotating the screws 30 in one direction or the other, the upper roller or drum 6 may be raised or lowered, thereby loosening or tightening the elevator belt 8. One of the spindles of the upper roller 6 is provided with a pulley 32, about which a belt 33 passes. Bolted or clamped to opposite sides of the casing 1 by the transverse bolts 34 are the cleats 35, and in bearings of each of which a shaft 36 is mounted. This shaft 36 is provided with a drive pulley 37, to which any suitable power (not shown) may be belted by means of the belt 38.

On one end of the shaft 36 is a grooved sheave or pulley 39, about which the belt 33 travels. The belt 33 also travels about a pulley or sheave 40, mounted upon a stub shaft 41 of the cleat 42, which is secured at one side to the casing 1. Pivoted at 43 to a projecting end of the cleat 44 is a lever 45 having a grooved sheave or pulley 46. By throwing the lever 45 in the direction of the arrow $b$, the sheave or pulley 46 is thrown in such a manner as to tighten the belt 33, there being a segment rack 47, dog 48 and hand grip 49 (including the rod connection 50 to the dog) for holding the lever 45 in adjusted positions. By adjusting the screws 30 in one direction or the other, the elevator belt is not only tightened or loosened, but also the belt 33. The lower portion of the side 52 of the casing is provided with an opening 53, adjacent which guides 54 and 55 are arranged, in which guides a gate 56 is mounted, which constitutes means for opening or closing the opening 53. Pivoted at 57 to the gate 56 is a pair of links 58, which in turn are pivoted to the lower end of the lever 59, which lever is pivoted at 60 to an angled arm 61 of the bracket 62 fastened to one side of the casing 1. By throwing the lever 59 in the direction of the arrow $c$ the gate 56 is thrown open, and by reverse movement of the lever 59 the gate is closed. A hopper 64 is provided having a discharge opening 65 arranged adjacent the opening 53. When the gate 56 is opened the grain (which is placed in the hopper) passes through the opening 53, and is picked up by the elevator buckets and elevated to the upper portion of the casing 1, which buckets empty the grain through the passage 10, from which the grain passes through the passage 16 into the railroad car. A pair of cleats 66 and 67 are bolted adjacent the opposite sides of the casing 1 by the bolts or rods 68 having eyes 69. Connected to the eyes 69 are rods 70, which pass through the side 71 of said hopper 64, and are provided with armed nuts 72, thereby constituting means to clamp the hopper in place. The lower end of the hopper is provided with a lug 73 to engage the recess 74 of the base 2, to further hold the hopper in place. By suspending the hopper in this manner, the lower end may be detached, in order to thoroughly clean the hopper out. As shown in full lines in Fig. 6, the side of the hopper having the discharge opening may be arranged as facing downwardly, when the gate 56 is closed, and the gate 75 at the opposite side is open. The hopper is not only disposed in this position when the gate 56 is closed, but also arranged in this position, when it is desired to gain access to the interior of the casing 1, so as to clean out the clogging grain.

Referring to the drawings, it is to be seen that the hopper 64 across its front face is tapering, as well as being tapering in side view, and owing to the taper, as shown in front view of the hopper, the hopper, when disposed in a raised position as shown in Figs. 6 and 7, will wedge into engagement with the casing of the grain elevator, thereby holding the hopper in such raised position. The gate 75 is held in place by the pivoted cross bar 76, which engages the brackets 77. This gate 75 is opened, when the portable elevator machine is arranged adjacent the car door opening, so that the grain will pass through the opening of the casing 1, said opening being designated by the numeral 78, in order to be picked up by the elevating buckets. When the grain is taken from the car in this manner, the gate 17 is adjusted to close the passage 16, thereby allowing the grain to pass out through the passage 15 into a wagon or other receptacle. The upper end of the casing 1 is provided with a suitable cover 79 hinged at 80, and adapted to be latched at 81.

From the foregoing in connection with the drawing it will be plainly seen how the elevator is utilized for elevating the grain to and from the railway car.

The invention having been set forth, what is claimed as new and useful is:—

In a grain elevator, an elongated vertical casing, an elevating conveyer mounted and operable in said casing, the lower portion of the casing upon one side thereof having an opening, a hopper detachably connected to the side of the casing adjoining said opening, so that as grain is deposited in said hopper, it will pass through the opening and be picked up by the elevator, said opening having guides adjacent thereto, and closure mounted on the guide for closing the opening, a pair of rods pivoted to the side of the casing and passing through the outer wall of said hopper, means threaded on said rods for clamping the hopper in a vertical position adjacent said opening, said hopper being tapering in front elevation, whereby the sides of the hopper will wedge in engagement with the vertical casing, which wedging engagement together with the rods, will hold the hopper in a raised or tilted horizontal position out of registration with said opening.

In testimony whereof we have signed our names to this specification in the presence of two subscribing witnesses.

FRANK MORRIS.
PETER B. KRAMER.

Witnesses:
H. R. LEITER,
JOHN H. JOHNSON.

Copies of this patent may be obtained for five cents each, by addressing the "Commissioner of Patents, Washington, D. C."